(12) United States Patent
Koszo et al.

(10) Patent No.: US 9,487,444 B2
(45) Date of Patent: Nov. 8, 2016

(54) APPARATUSES, SYSTEM AND METHODS FOR FORMING PRESSED ARTICLES AND PRESSED ARTICLES FORMED THEREBY

(75) Inventors: Sandor Koszo, Henan (CN); Lodovico Bardelli, Reggio Emilia (IT)

(73) Assignees: MASS S.P.A., Scandiano, Reggio Emilia (IT); VECOR IP HOLDINGS LTD, Sheung Wan, Hong Kong (CN)

( * ) Notice: Subject to any disclaimer, the term of this patent is extended or adjusted under 35 U.S.C. 154(b) by 301 days.

(21) Appl. No.: 14/112,763

(22) PCT Filed: Apr. 22, 2011

(86) PCT No.: PCT/IT2011/000127
§ 371 (c)(1),
(2), (4) Date: Jan. 15, 2014

(87) PCT Pub. No.: WO2012/143960
PCT Pub. Date: Oct. 26, 2012

(65) Prior Publication Data
US 2014/0141961 A1    May 22, 2014

(51) Int. Cl.
| | |
|---|---|
| B30B 15/32 | (2006.01) |
| B30B 11/02 | (2006.01) |
| B30B 11/14 | (2006.01) |
| B28B 13/02 | (2006.01) |
| B28B 3/02 | (2006.01) |
| C04B 33/00 | (2006.01) |
| C04B 18/08 | (2006.01) |
| B28B 3/12 | (2006.01) |

(Continued)

(52) U.S. Cl.
CPC ........... *C04B 18/088* (2013.01); *B28B 3/02* (2013.01); *B28B 3/123* (2013.01); *B28B 5/021* (2013.01); *B28B 13/022* (2013.01); *B28B 13/0205* (2013.01); *B28B 13/029* (2013.01); *B30B 11/027* (2013.01); *B30B 11/14* (2013.01); *B30B 15/302* (2013.01); *B30B 15/32* (2013.01); *C04B 33/00* (2013.01)

(58) Field of Classification Search
None
See application file for complete search history.

(56) References Cited

U.S. PATENT DOCUMENTS 4,388,144 A * 6/1983 Wemhoner ............... B27N 3/22
100/215
5,145,627 A * 9/1992 Berion .................... B28B 5/027
264/113

(Continued)

FOREIGN PATENT DOCUMENTS

| EP | 0995563 A1 | 4/2000 |
| EP | 1334811 A2 | 8/2003 |
| EP | 1433580 A2 | 6/2004 |

(Continued)

OTHER PUBLICATIONS

International Search Report for International Application No. PCT/IT2011/000127, mailed on Mar. 27, 2012.

*Primary Examiner* — Mary F Theisen
(74) *Attorney, Agent, or Firm* — Knobbe Martens Olson and Bear, LLP

(57) ABSTRACT

The invention relates to a method and a system (10) for forming pressed articles by pressing powder or granules, the system comprising the following apparatuses: a powder discharge assembly (12); a no-cavity press assembly (20) including: an bottom plate (22) that is the same size or greater than the pressed articles, a constraining means to isolate a portion of powder, and a top punch (24); and a conveyor (14) to transport the powder and/or pressed articles.

37 Claims, 6 Drawing Sheets

(51) Int. Cl.
  *B28B 5/02*   (2006.01)
  *B30B 15/30*  (2006.01)

(56) References Cited

U.S. PATENT DOCUMENTS 5,521,132 A    5/1996   Talmy et al.

2008/0099171 A1*  5/2008  Frank .................... B28B 5/027
                                                                162/156

FOREIGN PATENT DOCUMENTS

| WO | WO 96/15888 A1 | 5/1996 |
| WO | WO 98/23424 A2 | 6/1998 |

\* cited by examiner

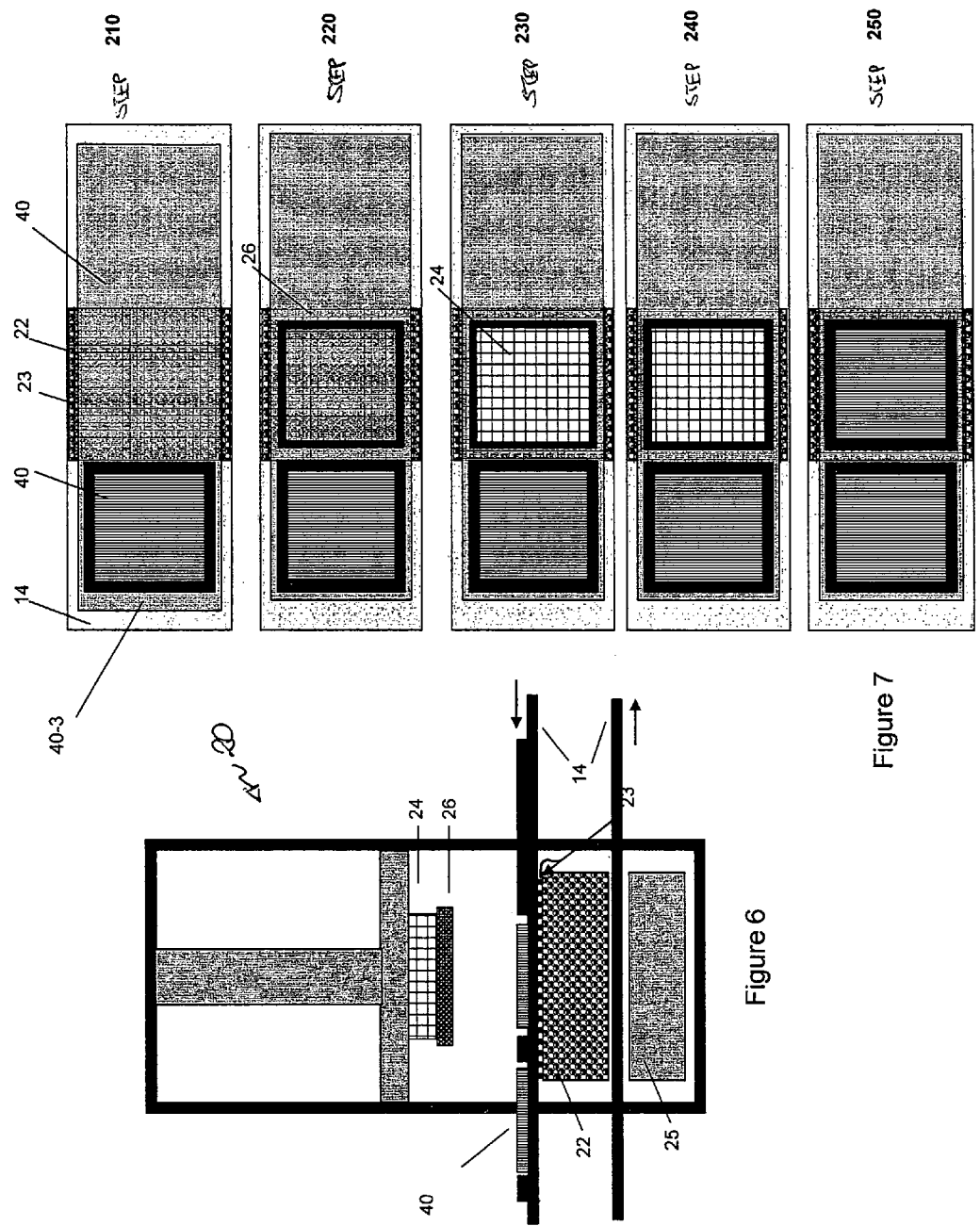

APPARATUSES, SYSTEM AND METHODS FOR FORMING PRESSED ARTICLES AND PRESSED ARTICLES FORMED THEREBY

CROSS-REFERENCE TO RELATED APPLICATIONS

This application is the U.S. National Phase under 35 U.S.C. §371 of International Application PCT/IT2011/000127, filed Apr. 22, 2011.

TECHNICAL FIELD OF THE INVENTION

The present invention relates to apparatuses, system and method for pressing powder, particularly to shaping floor and wall ceramic tiles from compositions containing fly ash.

BACKGROUND OF THE INVENTION

Ceramic powders are typically formed into tiles and other pressed articles by depositing spray dried clay based powder into a cavity where it is pressed into a compressed shape. This is known in the art as dry forming. The powder is deposited into the cavity by many different methods including conveyor, single batch hoppers, and multiple batch hoppers.

The charging hopper, which is typically used, is a vibrating funnel-shaped delivery vessel that deposits spray dried granules into a cavity either directly, or onto a single-batch measured volume delivery tray. In each deposition, the spray dried granules in the hopper are shaken down to the bottom of the hopper adjacent to the hopper exit door. When deposition occurs, the hopper is opened and a pre-determined amount of material is delivered into feeder tray that delivers the powder into the cavity.

Continuous uniform powder deposition is difficult to maintain due to formation of powder bridges in the narrowing funnel-shaped delivery vessel which causes brief and irregular interruptions in the smooth flow of powder. This is acceptable in a system that deposits powder into a constrained volume such as a press cavity or batch delivery vessel since the powder in the cavity can be manipulated to disperse evenly.

Once the powder is deposited in a press cavity, it is pressed to form a shaped article. The pressed article is ejected from the cavity by a bottom plate and pushed over to a take-off table to go to a dryer and a decoration unit. After decoration, the article can be moved directly into the kiln for firing, or it can be pressed again to imprint a design into the surface of the article and then moved into the kiln for firing.

A problem that often occurs during pressing ceramic tiles is lamination. Lamination usually occurs due to trapped air during pressing in between the powder layers. These laminations cause problems during firing. Commonly, the trapped air can cause discontinuations in the ceramic matrix which weaken the final strength and can alter the shape of the fired article. One way these laminations are avoided is to press the article slowly with multiple repetitions with increasing force. Each time the article is pressed and released, more air is extracted out of the article and more compaction is achieved. This slow process eliminates the lamination in the final article, but it reduces throughput and decreases the efficiency of a production line.

Another problem with articles pressed in cavities is that when they are lifted or pushed out of the press cavity, the residual lateral pressure that has developed in the article is released when the article clears the wall of the mold. This lateral relaxation can easily lead to cracks on the edge of article especially for compositions with limited plasticity such as a composition containing a high amount of fly ash, for example up to 90%. Unlike a fly ash based composition, the composition of the spray dried clay-based powder has sufficient resilience to withstand these forces.

There are significant differences in behavior between clay powder and fly ash powder in this process. This invention enables fly ash based composition to be pressed into floor and wall tiles as well as other articles. The composition containing up to 90% fly ash is composed of mostly non-crystalline, non-plastic minerals with round Shapes and few angularities. This allows the fly ash particles to move freely past each other without catching or binding together, which lowers green strength. The green strength of a material is defined as its ability to hold itself together when handled or manipulated after high pressure press forming. Because of these smooth particle morphologies, fly ash articles which are pressed in preparation for firing have a much lower green strength. Standard spray-dried clay-based compositions can withstand approximately 4 to 8 kg/cm^2 of load (modulus of rupture test) before being dried. The composition containing up to 90% fly ash has a typical green strength of about 1.5 to 2 kg/cm^2. There are additives that can be used to increase the green strength of fly ash articles. These include water, clays, and superplasticizers such as those described in PCT WO 05/033040 A1 "Manufacture of Articles from Flyash".

In a conventional press machine, as the machine shown in FIG. 1 and FIG. 2, the article 6 is pressed in a cavity 2 with press plates 1 and 3 and then lifted by a bottom plate level 4 to the surface of the work area where a pushing arm 5 moves it onto a conveyor to transport the article to the dryer and decoration unit or to the kiln for firing. Conventional spray dried clay-based compositions have sufficient green strength after pressing to withstand these manipulations. Articles made from compositions containing up to 90% fly ash, however, are typically too fragile, even after strengthening additives are used. This leads to an unacceptably high volume of damaged tiles, mostly due to the development of internal hairline cracks that will only be visible after firing.

As shown in FIG. 2, the conventional tile pressing process includes the following steps: at step 110, loading the cavity with powder; at step 120, pressing the powder with press plate, isostatic bottom plate level 4; at step 130, lifting off the top punch; step 140, raising up the pressed article 6; and at step 150, pushing the article 6 onto a conveyor 7 by a pushing arm 5 to the decoration or drying area.

CN2631726Y discloses a forming apparatus of ceramic tiles; the forming apparatus comprising a machine frame, a punching device uses cavity molding to press the powder article, an ejecting device, a guiding device, a governing plunger, a hydraulic control system for the ejecting device motion, and a feeding device toward a conveyer. The utility model can produce the ceramic tiles with different thicknesses.

For producing larger ceramic thin plate, CN 2631726Y discloses a transfer apparatus of ceramic tiles molding, the utility model provides a conveyor device in the ceramic tile molding equipment, which is composed of a press machine, an upper punch, conveyor or transporting belt, a belt wheel and a hopper. The feeding conveyor belt passes between the upper punch and the bottom die (cavity). The conveyor belt and the belt wheel combine to be a cyclic conveyor or system or a reciprocating conveyor system. And U.S. Pat. No. 5,521,132 discloses ceramic material (bar) made from raw coal fly ash of 90 wt. %, 92.5 wt. % and 95 wt. %, but it does not disclose how to press the powder to become a semi-dry bar.

U.S. Pat. No. 5,935,885 discloses a process for forming glass-ceramic tiles with fly ash from 60 wt. % to 100 wt. %. The fly ash is oxidized. The oxidized glass forming materials are vitrified to form a glass melt. This glass melt is then formed into tiles.

All of these disclosures are incorporated herein by reference.

In summary, one of the key challenges with using fly ash in standard ceramic tile manufacturing processes is that the pressed fly ash based composition has insufficient green strength to withstand the physical stresses involved when moving the tiles on to the conveyor belts to be transported for subsequent treatment.

The creation of a custom designed pressing and mould assembly was necessary to overcome the limitations of traditional ceramic tile press and mould assemblies that are not suitable for the manufacture of ceramic tiles using compositions containing 25% to 90% or even higher fly ash.

The currently available pressing and mould assemblies were tested and it was concluded that the following problems could not be overcome using commercially available methods.

A) Charging of the powder,
B) Lamination,
C) Cracking of edges upon ejection from the cavity,
D) Hairline cracks formed in article due to weaker than normal green strength,
E) Large percentage of breakage due to weaker than normal green strength,
F) Limited size of pressed article,
G) Reduced number of pressing strokes per minute.

Subsequently an industrial scale custom build solution has been designed, engineered, and constructed that overcomes all of the problems associated with the above mentioned issues.

SUMMARY OF THE INVENTION

An object of the invention is to provide apparatus, system and method able to shape and press an alternative ceramic composition containing a high percentage of fly ash, for example up to 90%, into high and consistent quality ceramic tiles especially for walls and floors.

Another object of the invention is to produce tiles continuously to increase productivity and tiles with different size and thickness.

The apparatuses, system and methods of the invention overcome all the above mentioned challenges. The new methods, apparatus and system can also be used for conventional clay materials saving energy and increasing productivity.

This invention is a collection of innovations that are pieced together to make a fully integrated system. The main innovations are as follows, among others:

A) An oscillating combs-based vibrating feeder.
B) An air permeable transport belt that travels the length of the apparatus and carries loose powder from the exit of vibrating feeder, through compactors, decorators, custom no-cavity pressing mould and take off table.
C) A compacting belt placed over the transporting belt.
D) A row of independent decorating devices charging dry decoration to the surface of the pre-compacted composition.
E) A top frame cavity mould assembly.
F) An bottom plate that is a greater size then the size of the pressed article.
G) A flexible grid fixed on the surface of the bottom plate.
H) A space under the mould to allow the belt to form a continuous loop.

According to a first aspect, the present invention relates to a system for forming pressed articles by pressing powder or granules comprising the following apparatuses:
a powder discharge assembly;
a no-cavity press assembly including:
an bottom plate that is the same size or greater than the pressed article,
a constraining means to isolate a portion of powder, and
a top punch; and
a conveyor to transport the powder.

In the present contest, the wording "no-cavity press assembly" refers to a press assembly wherein the pressing action is carried out on the same plane as the remaining production line. In other words, the pressing is carried out in a space without indented cavity-based confinement walls.

Thanks to the bottom plate which is the same size or greater than the pressed article, it is possible to achieve the pressed article to be evenly pressed without inconsistent non-isostatic borders.

According to one embodiment of the invention, the system further comprises a densification assembly that can partially compact and de-aerate the powder; and preferably a decorating unit to add decorating material over the powder before pressing.

This allows loose decoration glaze to be applied in finer detail than it would be possible on un-compacted material and allows avoiding a former pressing step provided in the prior art for this purpose.

According to one embodiment of the invention, the system further comprises a flexible grid underneath the conveyor fixed onto the top of the isostatic bottom plate.

This allows increased air release when the tile is pressed.

According to one embodiment of the invention, the bottom plate is an isostatic plate. This allows an evenly press action without inconsistent non-isostatic borders of the pressed articles.

According to one embodiment of the invention, the conveyor is an air permeable transport belt.

The advantage related to this feature is that air can be released from the pressed tile thus avoiding detrimental lamination within the pressed tile, at the same time allowing for a faster pressing cycle without the necessary 2 to 3 stage pressing and de-airing method According to one embodiment of the invention, the densification assembly includes rollers with different diameters and a compacting belt.

During compaction it is desirable to allow air to escape from both the bottom (through the air permeable main belt) and the top through the air permeable compacting belt. The different sized rollers help to regulate the speed of the compacting belt and its angle of contact with the powder. It is desirable to match the two belts in speed and gradually bring them together via the set angle in order to create a smooth compacted surface with no scuff marks or disturbances in the powder.

According to one embodiment of the invention, the powder or granules comprises: fly ash powder, clay powder, granulated fly ash, granulated clay, and combination or mixes thereof.

This is advantageous because these substances, generally, are waste products from industry and thus it is advantageous to remove them from the environment in a useful way using this apparatus and system.

According to one embodiment of the invention, the powder or granules further comprise other ingredients to modify the properties of the powder, granules, and/or the pressed article.

This is useful to allow a greater range of blended material to be used in the system. Different ingredients impart different traits to the pressed tiles such as increased green strength and lowered water absorption after firing.

According to one embodiment of the invention, the powder discharge assembly comprises:

a vibrating feeding means and a plurality of reciprocating combs which can break up the powder and evenly deposit it onto the moving conveyor.

This allows dispersing the delivered powder to form an even and consistent layer of material for subsequent compaction and decoration and pressing. The vibrating feeding means clumps are broken up that might otherwise be deposited on the main belt.

According to one embodiment of the invention, the reciprocating combs are arranged in parallel layers with tines of the combs on subsequent layers facing opposite directions, wherein the speed and amplitude of oscillation of the combs are adjustable including the height between the combs and the speed of the movement of the conveyor.

This is advantageous in order to tune the vibrating feeding means to the characteristics of the delivered material. Some materials will require greater disruption for even application onto the belt and others will need less. It is important to be able to tune these combs.

According to one embodiment of the invention, two of the rollers are twin rollers and the compacting belt can be arranged in such a manner that the space between the transport belt and the compacting belt gradually decreases until a desired distance is reached that is set by the height of a guide roller of the rollers at the end of the densification area.

This is important because the distance between the compactor belt and the main belt sets the amount the material is densified before decoration.

According to one embodiment of the invention, the densification assembly increases the density of the powder by 3% to 30% to form a densification area.

This has found to be an optimal densification range for subsequent decoration and pressing. Other densification amounts could be used, but these are most optimal.

According to one embodiment of the invention, the density is increased by 10% to 15%.

This has been found to be an optimal range, especially for coal ash derived materials.

According to one embodiment of the invention, glaze decoration material is applied to a moving continuous bed of partially densified powder on the conveyor to form a decoration area.

This is advantageous because the tile does not have to be moved to a separate decoration area as in the conventionally known processes. The decoration occurs immediately prior to the pressing.

According to one embodiment of the invention, the bottom support plate of the press area is movable and lifted into place during a press, but which drops down during the transport belt moving to allow the transport belt to pass beneath the isostatic plate on the way back to the front of an apparatus.

This is a way to allow the main belt to pass back under the press area and form a continuous loop.

According to one embodiment of the invention, the constraining means is a knife-edge cavity frame in any shape such as a circle, or square, or triangle, or the like, or a non-regular shape, and it isolates the portion of the continuous layer of powder to be pressed and provides lateral support to a pressed article, and wherein the constraining means rests on supports aligned with the conveyor in order to avoid damaging the conveyor.

This enables tiles of many shapes to be formed.

According to one embodiment of the invention, the overhead press plate presses the powder contained by the constraining means into a highly compacted article using pressures from about 150 kg/cm^2 to about 500 kg/cm^2.

This is an optimal pressure range to impart sufficient green strength in the final product.

According to one embodiment of the invention, the top punch may comprise designs or patterns.

This allows decorative or utilitarian designs to be pressed into the surface of the article.

According to one embodiment of the invention, the constraining means can be any shape of cavity frame with sharp edges to cut the pressed powder after compaction. This constraining means has the advantage of not requiring an indented fixed wall cavity thus allowing faster production.

According to one embodiment of the invention, the knife-edge cavity frame is removed from the pressed article before the top punch is removed.

The top punch holds the article in place while the knife edge is lifted to eliminate any possibility that the article would not separate cleanly from the knife edge. This also allows the article to relax laterally relieving pressure within the article during pressing, eliminating any internal stress in the pressed article.

According to one embodiment of the invention, the powder is dry powder which comprises up to 12% water.

This is optimal for green strength in the pressed tile.

According to one embodiment of the invention, the decorating material is colored glaze material.

According to one embodiment of the invention, the powder comprises fly ash up to 90%. This is advantageous because it allows a high percentage of recycled material to be used.

In a further aspect, the present invention relates to a system for continuously forming pressed article by pressing powder, comprising the following apparatuses:

a conveyor for transporting powder and/or pressed article;

a powder discharging means for discharging powder to the conveyor;

an initially densifying means for partially densifying the powder;

a constraining means for constraining a portion of the densified powder; and a press means for pressing the constrained portion powder.

In a further aspect, the present invention relates to a method for forming tiles, comprising:

depositing powder on a moving conveyor;

partially densifying the powder by compacting means;

constraining a portion of the powder by constraining means; and pressing the constrained powder.

In a preferred embodiment, the step of pressing the constrained powder is actuated with a force between about 150 kg/cm^2 and about 500 kg/cm^2 by pressing means.

According to one embodiment of the invention, the method comprises also decorating the densified powder by a decorating unit.

According to one embodiment of the invention, the powder is deposited in a continuous or discontinuous manner.

In this manner, the material can be put onto the belt in a continuous manner for volume production or it can be applied discontinuously if changes in the mold plate or decoration material are required.

According to one embodiment of the invention, the conveyor comprises an air permeable belt.

This allows compaction of the material without trapping air in the compacted material.

According to one embodiment of the invention, the compacting means comprises an air permeable belt.

This allows rapid pressing of the article while still allowing air to escape the pressed article to avoid lamination.

According to one embodiment of the invention the compacting means comprises three rollers with different diameter.

This allows the speed and angle of densification to be adjusted to avoid disruption of the surface of the material and make a smooth compaction.

According to one embodiment of the invention, the pressing means comprises top punch and bottom plate and the constraining means is a cavity frame with knife-edge.

The advantage of a knife edge is that a clean edge is formed on the finished article without the requirement of a bottom cavity, thus allowing for the pressing to take place on the belt itself.

According to one embodiment of the invention, decorating the denisfied powder comprises depositing glaze powder on top of the densified powder on a moving conveyor by using the decorating unit.

According to another aspect, the invention relates to a system for continuously forming pressed article by pressing powder, comprising: a conveyer for transporting powder and/or pressed article; a powder discharging means for discharging powder to the conveyor; an initially densifying means for partially densifying the powder; a constraining means for constraining a portion of the densified powder; and a press means for pressing the constrained portion powder.

According to another aspect, the invention relates to a method for continuously pressing tiles, comprising the following steps:
transporting powder to be pressed into a press area via a moving conveyor;
descending a knife-edge shaped cavity frame into said powder to constrain a portion of said powder;
descending a press plate within the borders of said knife-edge cavity frame to compact it into a pressed article;
lifting said knife-edge cavity frame off said pressed article;
lifting said press plate off said pressed article; and
moving the pressed article along said conveyor concomitantly moving fresh powder continuously into the press area.

According to one embodiment of the invention, the cavity frame can be formed in any outline shape including an oval, parallelogram, heart, star, or the like.

This is advantageous because a plurality of shapes can be made with this system easily and interchangeably.

According to one embodiment of the invention, said plate has patterns etched into its surface to be transferred to the pressed article.

This allows decorative or utilitarian designs to be pressed into the surface of the article.

According to the present invention, a pressed powder article obtainable by the system and method of the present invention comprises a high content of fly ash.

Preferably a pressed powder article made by the present method comprises fly ash up to 90%, but this system and method can also work with traditional clay based granulated powders to achieve increased efficiency.

According to one embodiment of the invention, the powder is dry powder which comprises up to 12% water.

According to another aspect of the present invention, a system of pressing powder continuously comprises:
means for discharging powder;
means for transporting the powder;
means for partially densifying the transported powder;
means for constraining a portion of the densified powder on the transporting means; and
means for pressing the constrained portion of powder.

According to one embodiment the system comprises also means for removing the pressed article from the press area According to one embodiment of the invention, the system further comprises a decorating unit to decorate the densified powder before pressing.

According to one embodiment of the invention, the powder discharging assembly comprises reciprocating combs to discharge the powder evenly.

According to one embodiment of the invention, the system further comprises a recycle means for collecting the waste powder.

By the present invention, the pressed powder or article can be transported from the press area without lifting, ejecting, pushing, or pulling on the article itself, and wherein the article is moved to a receiving belt or apparatus by advancing the transport belt with minimal physical manipulation or physical strain placed on the pressed article itself.

The invention is also useful in the field of any type of ceramic or porcelain tile production or any other purpose of powder pressing.

BRIEF DESCRIPTION OF THE DRAWINGS

The foregoing and other objects, advantages and features and the manner in which the same are accomplished, will become apparent for those skilled in the art after considering the following detailed description taken in conjunction with the accompanied drawings which illustrate the preferred and exemplary embodiments, wherein:

FIG. 6 shows schematically the press area according to one embodiment of the present application;

FIG. 7 shows the steps of the method of pressing articles highlighting the arrangement of the belt above and below the press plates, the bottom plate (e.g., an isostatic plate), the overhead press plate, and the constraining knife-edge cavity frame according to an embodiment of the present application.

DETAILED DESCRIPTION OF THE INVENTION

Figure 1:
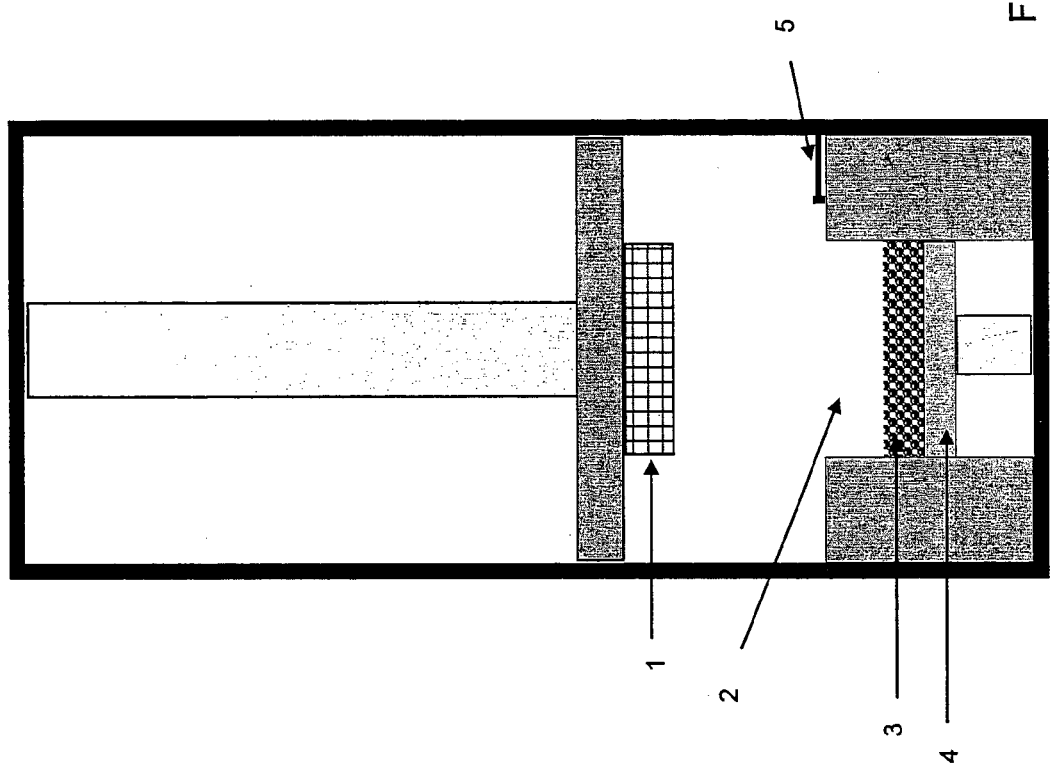
FIG. 1 shows a prior art system for pressing powders.
Figure 2:
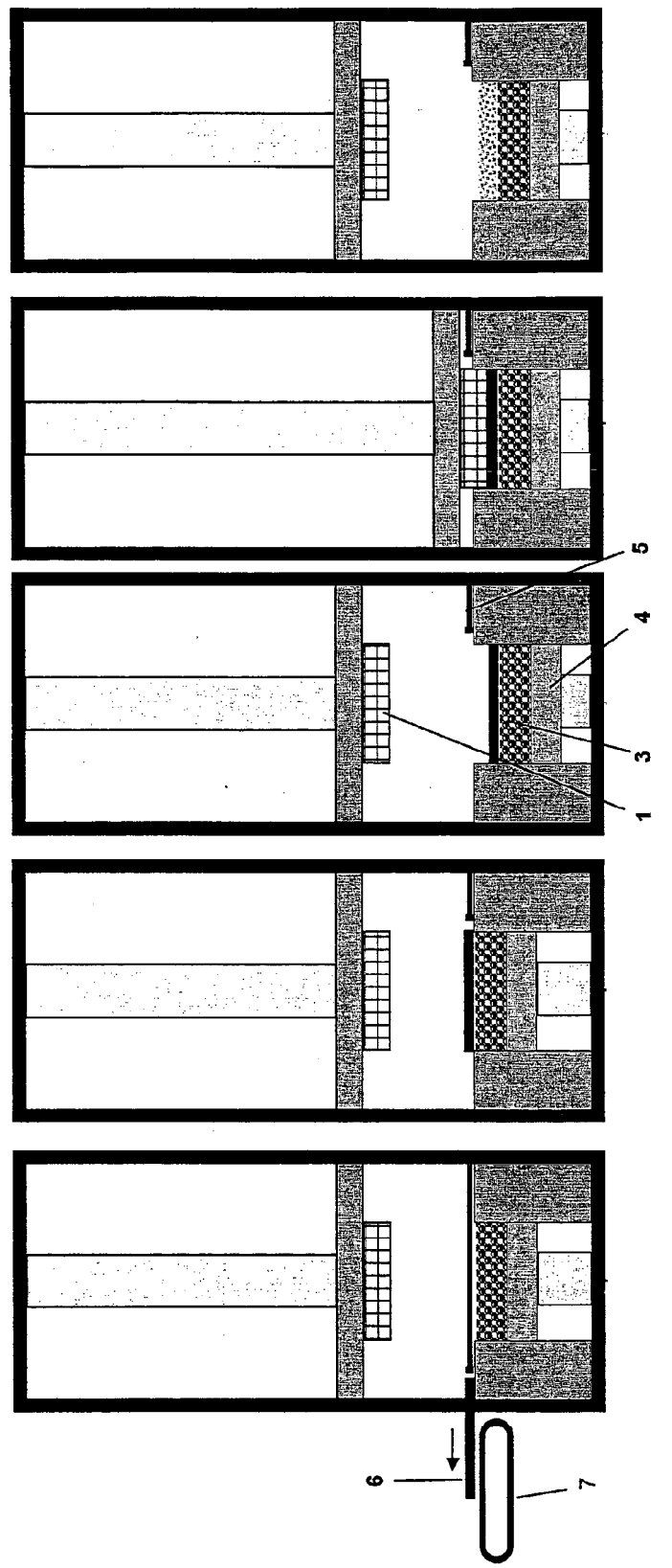
FIG. 2 shows a prior art method for forming tiles.
Figure 3:
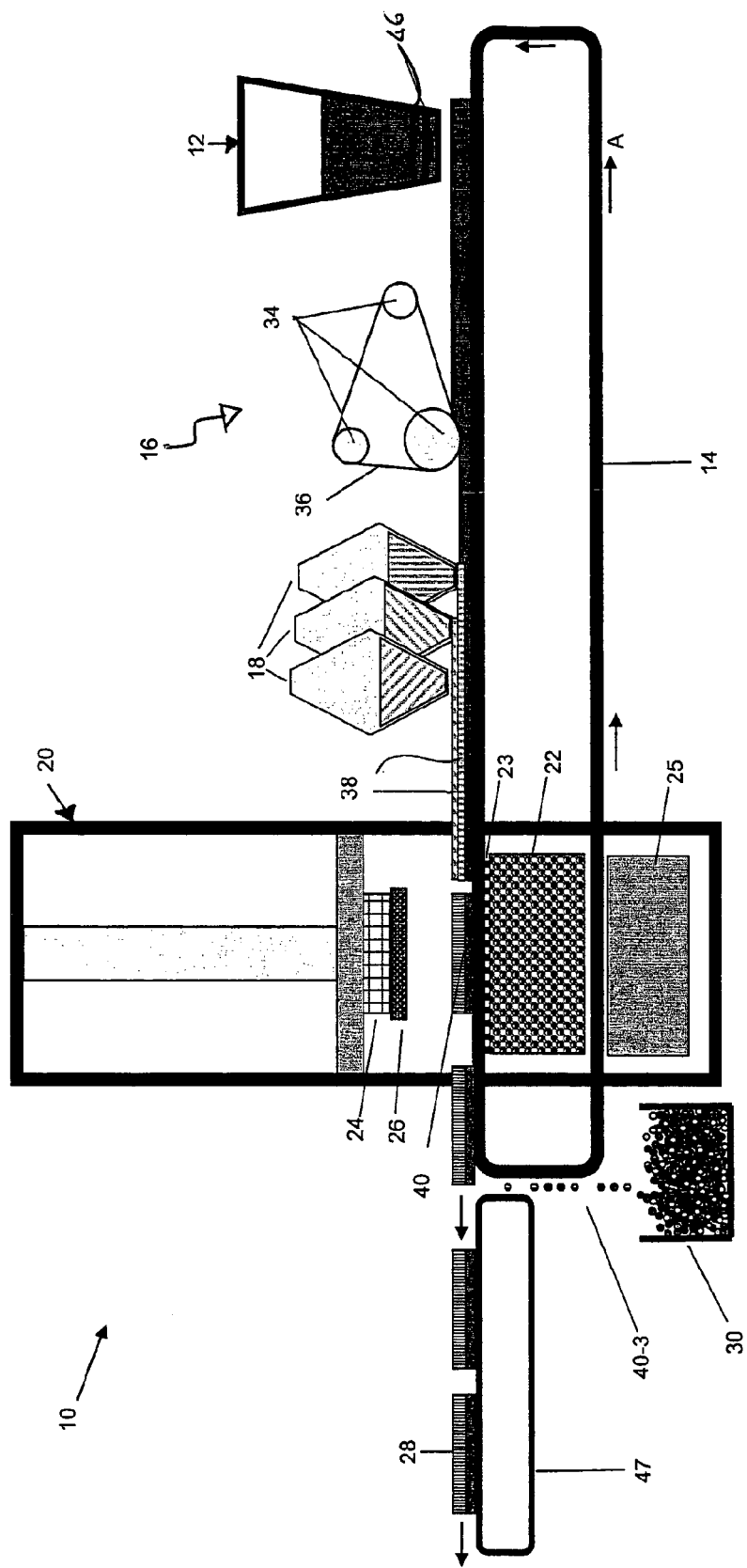
FIG. 3 shows an overview of a press system according to one embodiment of the present invention.

According to the invention the system 10 for forming pressed articles by pressing powder or granules comprises:
a powder discharge assembly 12;
a no-cavity press assembly 20 including:
an bottom plate 22 that is substantially the same size or greater than the pressed article,
a constraining means to isolate a portion of powder,
a top punch 24; and
a conveyor 14 to transport the powder.

1. Custom Design Vibrating Feeder/Power Discharge Assembly/Vibrating Feeding Means In a preferred embodiment of the present system, the power discharge assembly 12 comprises a vibrating feeder such as hopper which is filled with granulated fly ash or other ceramic compositions. The exit of the feeder is fitted with oscillating combs 46 through which the powered and granulated material falls homogenously on to the belt or any other kind of conveyor 14. These combs move parallel to each other to preventing agglomeration of granulated fly ash mixture.

Figure 4:
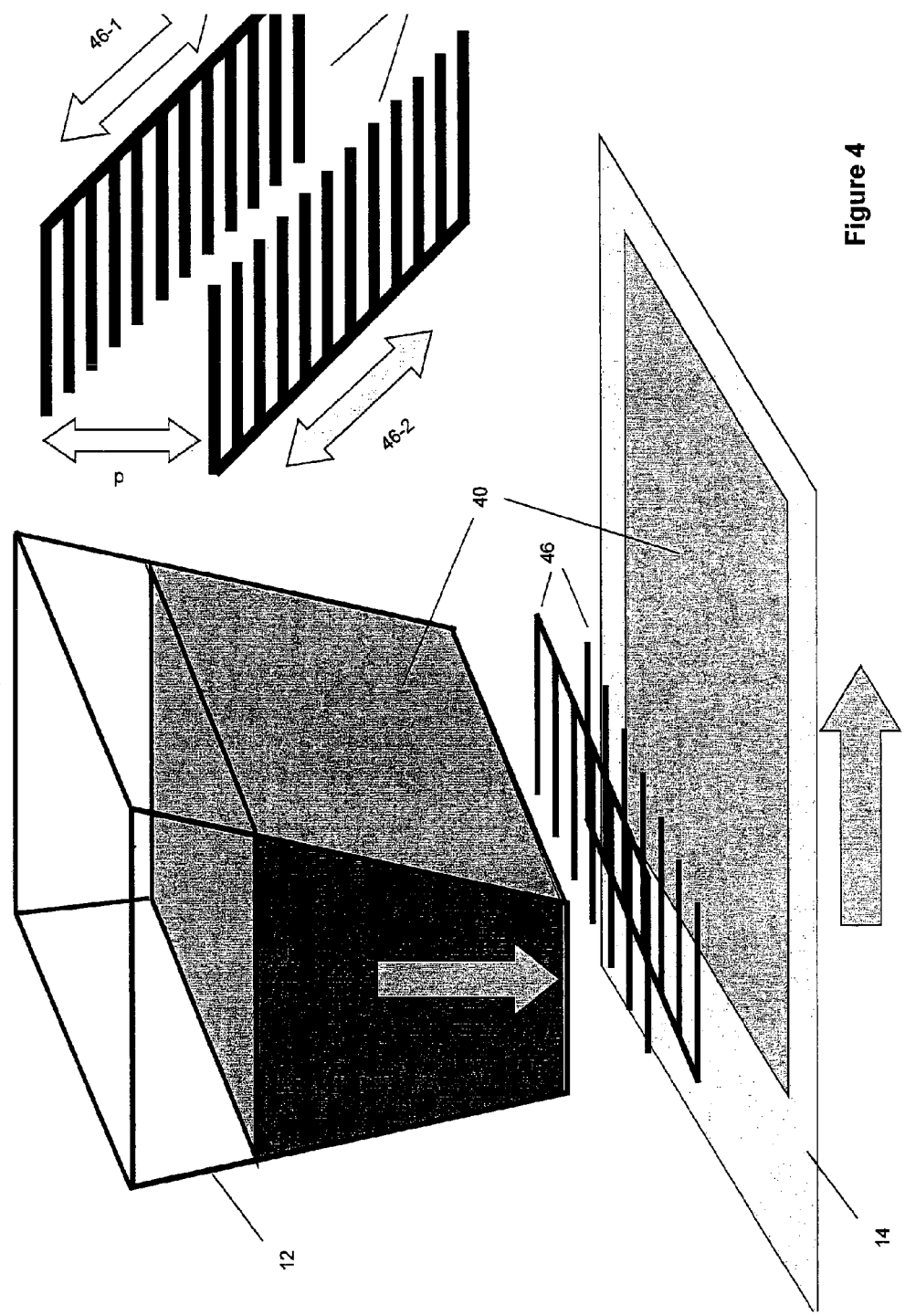
FIG. 4 shows schematically the powder discharge assembly showing the alternately facing combs according to one embodiment of the present application.
Figure 5:
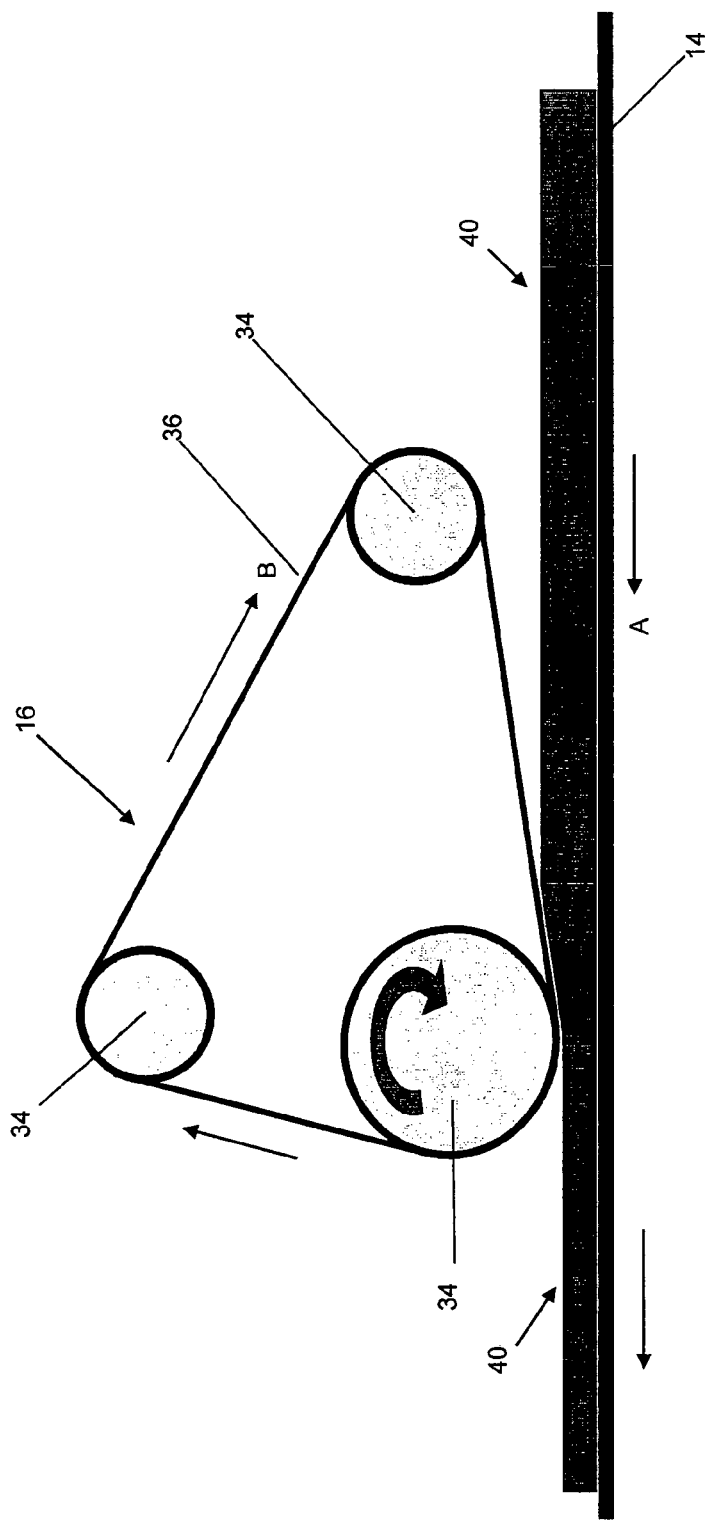
FIG. 5 shows the compacting belt assembly according to one embodiment of the present application.

A unique aspect of the moving combs is that they can be fully adjusted: their speed of movement, the horizontal distance between the combs, and the vertical distance d between the comb plates 46-1, 46-2, visible in FIG. 4. This allows any granule or powder, even those with very different clumping and flow characteristics, to be deposited smoothly and evenly on the conveyor 14. A layer of material is continuously deposited onto the moving transport belt to form a long, uninterrupted layer of loose powder up to 4 cm thickness. Virtually any size of tile 28 can be achieved as the width is only limited by the width of the power discharge assembly 12 and the conveyor 14.

This feeder solves the problem of an uneven distribution of materials.

2. Compacting Assembly/Initially Compacting Means

Preferably, after deposition onto the conveyor 14 such as transport belt, the well-dispersed granule layer is slightly compacted and partially de-aerated under an assembly that reduces the height of the granule layer by 3% to 30%. The height of the compacting assembly 16 can be adjusted to change the degree of compaction in the powder. The speed of the compacting assembly 16 is matched to the speed of the conveyor 14 in order to avoid scuff marks on the surface of the powder. This gentle compaction is used to remove temporary powder bridges and voids that might have formed during gravity deposition onto the transport belt. This also partially densifies and de-airs the powder making it suitable for the application of subsequent dry decoration giving the powder an initial cohesiveness.

The preferred embodiment of this compacting assembly 16 comprises rollers 34 and secondary belt 36. In this assembly the powder is slightly or partially compacted between the conveyor 14 and a secondary belt 36 which is controlled by rollers 34. In an embodiment of the present invention, two of the rollers 34 are twin rollers with same diameter while the third one with larger diameter, in another embodiment, all of the three rollers 34 can be with different diameter. The secondary belt 36 is arranged such that the distance between the conveyor 14 and secondary belts 36 gradually decreases. As the powder moves on the conveyor 14 under the secondary belt 36 it is slightly compacted and de-aerated. The amount of final compacting is set by the height of the final roller (the largest one) on the secondary belt 36. After that final roller 34 the secondary belt 36 returns to the front of the compaction stage producing a continuous cycle. In an embodiment of the present invention, the secondary belt 36 travels at the same speed as conveyor 14. And in one embodiment of the present invention, the secondary belt 36 can also be air permeable further allowing air to escape from the powder or granules during the pressing of the article to avoid undesirable lamination in the pressed article.

According to one embodiment of the invention the compaction of the powder can be achieved by any means of producing a compacted, flat surface, such as a traditional top press plate comprising of a flat fixed size plate which presses the powder to the desired densification. The advantage of this is that the system can be used with existing compaction equipment.

3. Decoration Means/Unit

This lightly compacted granules layer is moved by the transport belt or any other kind of conveyor 14 into position under multiple decoration units 18 to deposit colored glaze material 38 in a custom and random patterns. The details of decorator unit 18 are common in the industry and to one skilled in the art.

4. No-Cavity Press Assembly/Top Cavity Mould Assembly

The possibly decorated layer of granules is then transported on the belt to a custom press assembly 20. This is a specially designed press mould assembly uses no cavity to contain granules during pressing. The decorated or undecorated composition layer is pressed on the transport belt to form a pressed article so that subsequent stress on the pressed article is minimized.

During the press, a section of the powdered layer that has gone through the decoration area is oriented in the press area. The press area contains an bottom plate 22 (e.g. an isostatic plate), and can contain a flexible grid 23 to allow the air to escape from the bottom of the transport belt, an overhead tile forming top punch 24 that applies high pressure whilst the granules are contained within a given area by a constraining means such as a shaped knife-edge constraining cavity frame 26 which can be formed in any shape or manner such a circle, square, or any non-regular shape which depends on the shape of the tiles to be pressed. And the cavity frame with knife-edge can be formed by band of any suitable material such as metal or alloy.

Surrounding the overhead top punch 24, which is independent of the plate, is this shaped knife-edge constraining cavity frame 26 that descends before the top punch 24 and goes into the powder layer to isolate a portion or section of the powder, like a cookie cutter. This knife-edge constraining cavity frame 26 can be of any shape or size, and constrains a portion of the powder on the belt, in the press area, isolating it from the surrounding powder. The knife-edge does not cut into, or damage the conveyor or belt because it rests on adjustable external stops which support its weight and any additional pressure during the press forming. The top punch 24 has the same dimensions and shape as the knife-edge constraining cavity frame 26 and it goes inside the cavity frame to press the powder.

The bottom plate 22 which sits under the conveyor 14 in the press area is an oil and rubber force distribution and equalization plate that removes variations in the pressing force experienced by the entire size of the pressed article under pressure. This is unique because the standard isostatic punch currently used in the industry sits at the bottom of the cavity and is bordered by a steel plate, making it impossible to press the article completely over the isostatic plate. The area of the isostatic bottom plate 22 is equal to or larger than the area under high pressure leading to increased accuracy and even distribution of the forming pressure.

On the top of the bottom plate 22 can be fixed a flexible grid 23 facilitating more air to pass through the bottom of the belt during the pressing.

While the belt is moving, a bottom support plate 22 is raised slightly to allow the transport belt to pass below it. During the press, this bottom plate drops into place trapping the returning transport belt and forming a continuous bottom support for the top punch 24.

During the pressing, overhead top punch 24 descends inside the knife-edge cavity frame to compress the constrained powder and form a pressed article. The pressure is delivered from about 150 to about 500 kg/cm^2. During the pressing, conveyor 14 is compressed against the bottom plate 22 under the formed tile. The belt conveyor 14 is receiving two compressions: one area is above the bottom plate 22 and under the fly ash, and another area is under the bottom plate 22 between it and a base support (25).

The top punch 24 may be etched with a relief pattern that is transferred to the pressed tile as a positive image. Using a combination of etched pressing plate and applied decorative glaze material 38, any pattern or decoration can be created on the surface of the pressed powder 40. In this way, a multitude of decorative effects can be formed on tiles 28 made in this system, which increases their market value.

After the pressure is applied and the article is formed, first the knife-edge constraining cavity frame 26 is lifted to free the sides of the tile and allow the material to relax while still under pressure from the top punch 24. Then the top punch 24 is lifted and the piece is free on the conveyor 14. The bottom plate 22 then moves to allow the conveyor 14 to travel again.

5. Transporting Means/Conveyor

The conveyor 14 such as a transport belt is an air permeable belt made from a reinforced synthetic material such as nylon or polyester. The belt carries the loose powder through a compacting assembly 16, a decoration unit 18, and the press assembly 20. This belt can be any width to accommodate any width the press machine can handle. This belt is continuous and runs along the whole processing stage through all the preparation areas carrying the powder 40 to the press area and beyond to the take off table. This belt transports the pressed tile 28 to the receiving apparatus 47 which can deliver it to a dryer, or storage racks or to a firing kiln. After exiting the press area and the take off table delivering the pressed articles to a second drying belt or rack, the belt travels back under the whole apparatus to start again at the beginning of the machine.

An important attribute of the conveyor 14 is that it has enough porosity to allow air to escape beneath it during pressing of granules. This porosity allows air to escape that would otherwise be trapped within the article and cause detrimental laminations. With the air permeable belt a single application of pressure is possible rather than multiple quick presses as in traditional cavity presses. This decreases the time needed for each stroke of press and each stroke of press produces one article which increases the throughput. The material of the belt must also have sufficient durability to withstand repeated compressions by the press apparatus. To increase air release a mesh can be installed under the belt and over the isostatic plate.

There are many ways to achieve the characteristic of air permeability in the belt such as small perforations in a solid belt material, bonding together overlapping layers of open mesh material, or tightly woven synthetic material.

The conveyor 14 moves the item forward to a take-off table (not shown) where it is transferred to a drying apparatus (not shown). By moving the completed piece away from the press area, new powder is brought into alignment with the press plates and a new tile can be formed. When a formed tile reaches the end of the belt assembly it is automatically transferred to another belt of the receiving apparatus 47 to be carried into the drying room or firing kiln. The transfer belt simply travels downward over a roller and then back under the press to start again at the beginning of the machine. As the belt drops down from the work area, the formed piece continues horizontally and separates from the transport belt in a gentle pealing manner. At all times in the pressing process the tile does not need to support its own full weight, avoiding the standard physical handling or manipulation related stresses experienced by the pressed article using the currently available standard pressing systems used for the manufacture of ceramic tiles.

During the entire process of powder deposition, compaction, decoration, and pressing the belt is only stopped briefly during the actual press. All other times the material is continually moving and a new batch or portion of powder is being prepared just behind the article being pressed. In this way, a continuous stream of powder is deposited, compacted, decorated, and pressed at a rate of ten or more articles per minute.

The belt is air permeable that allows air to escape from the powder or granules during the pressing of the article to avoid undesirable lamination in the pressed article, which in return achieves a higher number of strokes per minute.

According to one embodiment of the present invention, the apparatus/system includes a recycle container 30 to collect the waste powder 40-3 after the as pressed item 40 go through the top punch 24.

According to one embodiment of the invention, a method for pressing the tiles comprises: in step 210, moving the new powder into the press area by the conveyor 14 such as transport belt; in step 220, constrain a portion of the powder within a constraining cavity frame 26 in any shape with knife edge; in step 230, pressing the powder with the constraining cavity frame 26 by pressing the top punch 24; in step 240, lifting off the constraining cavity frame 26 off the item 40-2 while remaining the top punch 24; and in step 250, lifting up the top punch 24.

The pressed article may be moved from the pressing area by moving the belt forward.

As a result, the pressed article by the present system and methods can be virtually any size which is not limited by the capacity of the apparatus or system.

The present invention relates also to a system 10 of pressing powder continuously, comprising:

a powder discharging assembly 12 to discharge powder;

a conveyor 14 to transport the powder;

a compacting assembly 16 to partially densify the transported powder;

a constraining assembly to constrain a portion of the densified powder on the moving conveyor 14; and a no-cavity press assembly 20 to press the constrained portion of powder.

Preferably such system 10 comprises a decorating unit 18 to decorate the densified powder before pressing and/or the powder discharging assembly comprises reciprocating combs to discharge the powder evenly.

Although the present invention has been developed for high percentages of fly ashes in order to use a high percentage of recycled material, the powder may also comprises conventional ceramic tile raw material. In this case, higher production volumes in conventional process lines are achieved. Also this process allows conventional tiles to be made larger than can be achieved in cavity-based press machines.

Although certain exemplary embodiments and methods have been described herein in some details by way of example, it will be apparent from the foregoing disclosure to those skilled in the art that variations, modifications, and changes may be made without departing from the spirit and scope of the present invention. For example, as those skilled in the art can easily contemplate, the present apparatus, methods and system can also be suitable to press other composition powder continuously or in-continuously with fly ash, such as 25, 30, 35, 40, 45, 50, 55, 65, 75, 80, 85, 90, 92, 94, 96, 98 and 100 wt. %, or without any fly ash at all.

Therefore, the above description should not be taken as limiting the scope of the invention which is defined by the appended claims.

What is claimed is:

1. A system for forming pressed articles by pressing powder or granules comprising the following apparatuses:
    a powder discharge assembly;
    a no-cavity press assembly comprising:
    a bottom plate that is substantially the same size or greater than the pressed articles,
    a constraining mechanism configured to isolate a portion of powder, and
    a top punch; and
    a conveyor to transport the powder and/or pressed articles, wherein the conveyor is an air permeable transport belt.

2. The system of claim 1, further comprising a compacting assembly suitable for partially compacting and de-aerating the powder.

3. The system of claim 1, further comprising a decorating unit suitable for adding decorating material over the powder before pressing.

4. The system according to claim 1, further comprising a flexible grid underneath the conveyor fixed onto the top of the bottom plate.

5. The system according to claim 1, wherein the bottom plate is an isostatic plate.

6. The system according to claim 2, wherein the compacting assembly comprises rollers with different diameter and compacting secondary belt.

7. The system according to claim 1, wherein the powder or granules are selected from the group consisting of fly ash powder, clay powder, granulated fly ash, granulated clay, and combination or mixes thereof.

8. The system according to claim 1, wherein the powder or granules further comprises other ingredients to modify the properties of the powder, granules, and/or the pressed article.

9. The system according to claim 1, wherein the powder discharge assembly comprises:
    a vibrating feeding mechanism; and a plurality of reciprocating combs which are suitable for breaking up the powder and evenly depositing it onto the moving conveyor.

10. The system of claim 9, wherein the reciprocating combs are arranged in parallel layers with tines of the combs on subsequent layers facing opposite directions, wherein the speed and amplitude of oscillation of the combs are adjustable including the height between the combs and the speed of the movement of the conveyor.

11. The system of claim 6, wherein two of the rollers are twin rollers and the secondary belt can be arranged in such a manner that the space between the transport belt and the compacting belt gradually decreases until a desired distance is reached that is set by the height of a guide roller of the rollers at the end of the densification area.

12. The system of claim 11, wherein the densification assembly increases the density of the powder by 3% to 30% to form a densification area.

13. The system of claim 12, wherein the density is increased by 10%-15%.

14. The system of claim 3, wherein glaze decoration material is applied to a moving continuous bed of the partially densified powder on the conveyor to form a decoration area.

15. The system of claim 1, wherein the bottom support plate of the press area is movable and drops into place during a press, but which lifts up during the transport belt moving to allow the transport belt to pass beneath the isostatic bottom plate on the way back to the front of an apparatus.

16. The system according to claim 1, wherein the constraining mechanism is a knife-edge constraining cavity frame in any shape including circle, or square, or triangle, or a non-regular shape, and it isolates the portion of the continuous layer of powder to be pressed and provides lateral support to a pressed article, and wherein the constraining mechanism rests on supports aligned with the conveyor in order to avoid damaging the conveyor.

17. The system of claim 15, wherein the top punch presses the powder or densified powder contained by the constraining mechanism into a highly compacted article using pressures from about 150 kg/cm$^2$ to about 500 kg/cm$^2$.

18. The system of claim 16, wherein the top punch may comprise designs or patterns.

19. The system of claim 1, wherein the constraining mechanism may be any shape of cavity frame with sharp edges to cut the pressed powder after compaction.

20. The system of claim 16, wherein the constraining cavity frame is removed from the pressed article before the top punch is removed.

21. The system according to claim 1, wherein the powder is dry powder which comprises up to 12% water.

22. The system of claim 3, wherein the decorating material is colored glaze material.

23. The system of claim 2, wherein the powder comprises fly ash up to 90%.

24. A system for continuously forming pressed article by pressing powder, comprising the following apparatuses:
    a conveyor for transporting powder and/or pressed article;
    a powder discharging mechanism for discharging powder to the conveyor;
    an initially densifying mechanism for partially densifying the powder;
    a constraining mechanism for constraining a portion of the densified powder; and
    a press mechanism for pressing the constrained portion powder.

25. A method for forming tiles, comprising:
    disposing powder on a moving conveyor;
    partially densifying the powder using a compacting mechanism;
    constraining a portion of the powder using a constraining mechanism; and
    pressing the constrained powder using a pressing mechanism.

26. The method of claim 25, further comprising decorating the densified powder by a decorating unit.

27. The method of claim 25, wherein the powder is disposed in a continuous or discontinuous manner.

28. The method of claim 27, wherein the conveyor comprises an air permeable belt.

29. The conveyor of claim 27, wherein the compacting mechanism comprises an air permeable belt.

30. The method of claim 26, wherein the compacting mechanism comprises three rollers with different diameter.

31. The method of claim 25, wherein the pressing mechanism comprises a top punch and bottom plate and the constraining mechanism is a constraining cavity frame with knife-edge.

32. The method of claim 26, wherein decorating the densified powder comprises disposing glaze powder on top of the densified powder on the moving conveyor by using the decorating unit.

33. The method of claim 25, wherein the pressing is performed by a force between about 150 kg/cm^2 and about 500 kg/cm^2.

34. A system of pressing powder continuously, comprising:
- means for discharging powder;
- means for transporting the powder;
- means for partially densifying the transported powder;
- means for constraining a portion of the densified powder on the transporting mechanism; and
- means for pressing the constrained portion of powder.

35. The system of claim 34, further comprising mechanism for decorating the densified powder before pressing.

36. The system of claim 34, wherein the mechanism for discharging comprise reciprocating combs to discharge the powder evenly.

37. The system of claim 34, further comprising a recycle mechanism for collecting the waste powder.

* * * * *